US012190543B2

(12) United States Patent
Ryan

(10) Patent No.: US 12,190,543 B2
(45) Date of Patent: Jan. 7, 2025

(54) LENS CALIBRATION METHOD FOR DIGITAL IMAGING APPARATUS

(71) Applicant: Ash Technologies Ltd., Naas (IE)

(72) Inventor: Louis Ryan, Naas (IE)

(73) Assignee: Ash Technologies Ltd. (IE)

( * ) Notice: Subject to any disclaimer, the term of this patent is extended or adjusted under 35 U.S.C. 154(b) by 496 days.

(21) Appl. No.: 17/626,057

(22) PCT Filed: Jul. 10, 2020

(86) PCT No.: PCT/EP2020/069633
§ 371 (c)(1),
(2) Date: Jan. 10, 2022

(87) PCT Pub. No.: WO2021/005231
PCT Pub. Date: Jan. 14, 2021

(65) Prior Publication Data
US 2022/0398778 A1    Dec. 15, 2022

(30) Foreign Application Priority Data

Jul. 10, 2019    (GB) ..................................... 1909879

(51) Int. Cl.
*G06K 9/36*    (2006.01)
*G06T 7/60*    (2017.01)
(Continued)

(52) U.S. Cl.
CPC .................. *G06T 7/80* (2017.01); *G06T 7/60* (2013.01); *G06V 10/44* (2022.01); *G06T 2207/10056* (2013.01)

(58) Field of Classification Search
CPC ......... G06T 7/80; G06T 7/60; G06T 2207/10; G06T 2207/10056; G06V 10/40; G06V 10/44
See application file for complete search history.

(56) References Cited

U.S. PATENT DOCUMENTS 6,960,756 B1    11/2005    Penumadu et al.
2007/0211243 A1    9/2007    Laroche et al.
(Continued)

FOREIGN PATENT DOCUMENTS

EP    1369663 A1    12/2003
JP    2010 061488 A    3/2010

OTHER PUBLICATIONS

Interactive and Multimodal-based Augmented Reality for Remote Assistance using a Digital Surgical Microscope' by Wisotzky et al, IEEE Conference on Virtual Reality and 3D User Interfaces (VR) Mar. 23-27, 2019, pp. 1477 to 1484.

*Primary Examiner* — Duy M Dang
(74) *Attorney, Agent, or Firm* — Clark Hill PLC; James R. Foley

(57) ABSTRACT

A method and system for calibrating a digital imaging apparatus by placing an object of known dimensions in a camera field of view, creating a digital image of the object, measuring the object dimensions in the digital image, creating a mathematical relationship between the object dimensions and the measured object dimensions in the digital image, creating n additional digital images each image having a distinct camera zoom level; measuring the position of a plurality of locations on the object for the n additional images, calculating a value for said locations in the n additional digital images, linking corresponding locations in the n additional images to create a calibration metric for a plurality of zoom values and calibrating any lens by comparing the zoom position of the lens in a camera with the calibration value. The present invention reduces calibration time and generates images which can be quickly verified by the operator.

26 Claims, 8 Drawing Sheets

(51) Int. Cl.
*G06T 7/80* (2017.01)
*G06V 10/44* (2022.01)

(56) References Cited

U.S. PATENT DOCUMENTS

| | | |
|---|---|---|
| 2015/0035965 A1 | 2/2015 | Winterot et al. |
| 2015/0036027 A1 | 2/2015 | Winterot et al. |
| 2015/0248003 A1* | 9/2015 | Li .......................... G02B 21/36 |
| | | 348/80 |

* cited by examiner

LENS CALIBRATION METHOD FOR DIGITAL IMAGING APPARATUS

This application is a National Phase Filing of PCT/EP2020/069633, having an International filing date of Jul. 10, 2020, which claims priority of Great Britain Patent Application No. 1909879.7, having a filing date of Jul. 10, 2019. The disclosure of the foregoing are hereby incorporated by reference.

FIELD

The disclosure relates to a lens calibration method and system, and in particular to one which is suitable for use with a digital imaging apparatus such as a digital microscope.

BACKGROUND

Digital microscope imaging systems are well known art in the art. Digital microscopes can be used in the measurement, verification or validation in a quality assurance process across many industries.

An integrated full HD (1080p) digital microscope and measurement system is known in the art. Such a microscope can provide a custom platform that incorporates a highly configurable and upgradeable set of inspection and measurement applications such as focus stacking, 2D measurement, side by side and overlay image comparison.

In a typical example an image processing and control engine can deliver full HD live video image quality at 60 frames per second enabling it to be utilised as a solution in a broad range of quality control, testing, rework, assembly, inspection and documentation tasks. A Graphical User Interface can be a mouse controlled Interface delivering intuitive and efficient operation and control of a full application suite. Camera control functions (auto and manual focus, exposure, gain, brightness, white balance) can be provided.

In use, calibration of the instrument is required to ensure that accurate, repeatable and reliable measurements are being made. It is known to calibrate a microscope system by using a known measurement at a fixed zoom. Measurement is made by first calibrating a graticule in the system against a stage micrometer which then gives a multiplier value.

Due to the differences between each camera, a standard mm/px data table could not be shared between all cameras. Numerous other publications in the prior art include US2015/036027; US2007/0211243, US2015/0035965, U.S. Pat. No. 6,960,756 and a paper entitled 'Interactive and Multimodal-based Augmented Reality for Remote Assistance using a Digital Surgical Microscope' by Wisotzky et al, IEEE Conference on Virtual Reality and 3D User Interfaces (VR) 23-27, March 2019, pages 1477 to 1484. However none of these publications teaches a way to reduce calibration time effectively.

It is an object of the present invention to reduce calibration time and generate images which can be quickly verified by an operator.

SUMMARY

In accordance with a first aspect of the invention there is provided, as set out in the appended claims, a method for calibrating a digital imaging apparatus, the method comprising the steps of:
  placing an object of known dimensions in a field of view at a predetermined distance from the camera;
  creating a digital image of the object;
  measuring the object dimensions in the digital image;
  creating a mathematical relationship between the object dimensions and the measured object dimensions in the digital image;
  creating n additional digital images each image having a distinct camera zoom level;
  measuring the position of a plurality of locations on the object for the n additional images;
  calculating a value for said locations in the n additional digital images;
  linking corresponding locations in the n additional images to create a calibration metric for a plurality of zoom values; and
  calibrating a lens by comparing the zoom position of the lens in a camera with the calibration value.

The present invention reduces calibration time and generates images which can be quickly verified by the operator. Traditionally, the user would calibrate a fixed zoom position using a stage micrometer.

The present invention uses image processing techniques to read multiple measurements over a cameras zoom range for self calibration to generate a lookup table which is used to calculate geometric measurements.

In one embodiment during calibration a measurement is made using 640 pixels, wherein the resulting mm/pixel value is used to calculate distances/areas of point locations anywhere on a screen.

In one embodiment, the object dimension being measured is a straight line.

In one embodiment, the straight line follows a horizontal axis across the digital image.

In one embodiment, the straight line follows a vertical axis across the digital image.

In one embodiment, the object dimension being measured is two dimensional, for example, square, rectangular or curved.

In one embodiment, the object is a ruler.

In one embodiment, the ruler has scale markings which define fixed distances between points on the ruler.

In one embodiment, measuring the object dimension comprises creating a calibration region on the digital image, measuring the object dimension with reference to the calibration region.

In one embodiment, the digital image measurement is made in pixels.

In one embodiment, the digital image calibration region comprises a straight line.

In one embodiment, the digital image calibration region comprises a two-dimensional shape, for example, square, rectangular or curved.

In one embodiment, the shape of the calibration region matches that of the object dimension.

In one embodiment, the plurality of locations are scale markings on a ruler.

In one embodiment, the step of calculating a value comprises creating a ratio of the actual object dimension and the digital image measurement.

In one embodiment, the calibration metric is a graph or formula representing a graph curve.

In one embodiment, the calibration metric is a look-up table.

In one embodiment, the step of creating n additional digital images comprises, creating a digital image at a zoom level, extracting the calibration region from the image, adding it to a calibration image as a first line, changing the zoom level and repeating n times to create a series of lines on the calibration image.

In one embodiment, the blank image is a bitmap image.

In one embodiment, the digital image is converted to a grayscale image.

In one embodiment, the calibration image is processed by scanning each row in the image to detect pixels which represent lines and recording their position.

In one embodiment, the detected line positions are extracted for use in a calibration graph or table.

In one embodiment, a plurality of lines are extracted for a single zoom value.

In accordance with a second aspect of the invention there is provided a computer program comprising program instructions for carrying out the method of the first aspect of the invention.

In another embodiment there is provided a system for calibrating a digital imaging apparatus, the system comprising:
  means or a module for placing an object of known dimensions in a field of view at a predetermined distance from a camera;
  means or a module for creating a digital image of the object obtained from said camera;
  means or a module for measuring the object dimensions in the digital image; characterised by:
  means or a module for creating a mathematical relationship between the object dimensions and the measured object dimensions in the digital image;
  means or a module for creating n additional digital images from said camera, each image having a distinct camera zoom level based on the mathematical relationship;
  means or a module for measuring the position of a plurality of locations on the object for the n additional images;
  means or a module for calculating a calibration value for said locations in the n additional digital images;
  means or a module for linking corresponding locations in the n additional images to create a calibration metric for a plurality of zoom values; and
  means or a module for calibrating a lens by comparing the zoom position of the lens in the camera with the calibration metric.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

FIGS. 1 to 13 below present an example of a calibration system and method in accordance with the present invention.

In this example, for the image to be in focus throughout the zoom range the camera is placed into infinity focus mode. The focal point is set by zooming to the maximum optical position and adjusting the height of the camera until the image is in focus. This is the focal position used for the calibration.

Figure 1:
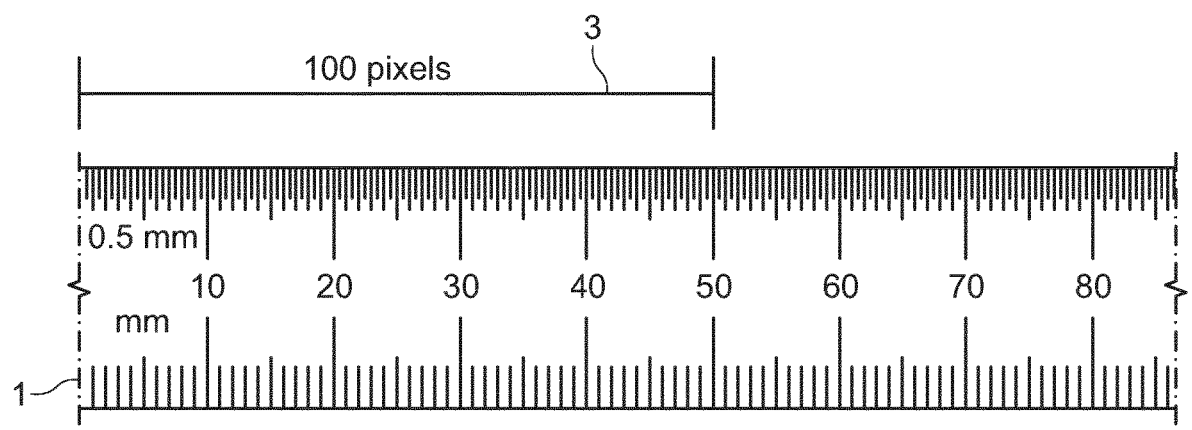
FIG. 1 shows a ruler with scale markings which may be used as part of the calibration system and method of the present invention.

FIG. 1 show a ruler 1 which has scale markings. Also shown is a distance 3 measured in pixels which is measured on an image of the ruler. To calibrate a single zoom position on a measurement system, the ruler 1 is placed under the camera and two points are selected to represent a known distance 3. The known distance divided by the distance in pixels on the image between these two points gives a mm/px value for that zoom level.

In the example shown in FIG. 1, there are 50 mm/100 pixels=0.5 mm/px. Using this value, we can measure between any two points on the screen. It is important to note that this measurement must be made on the same plane to the calibration taken.

Figure 2:
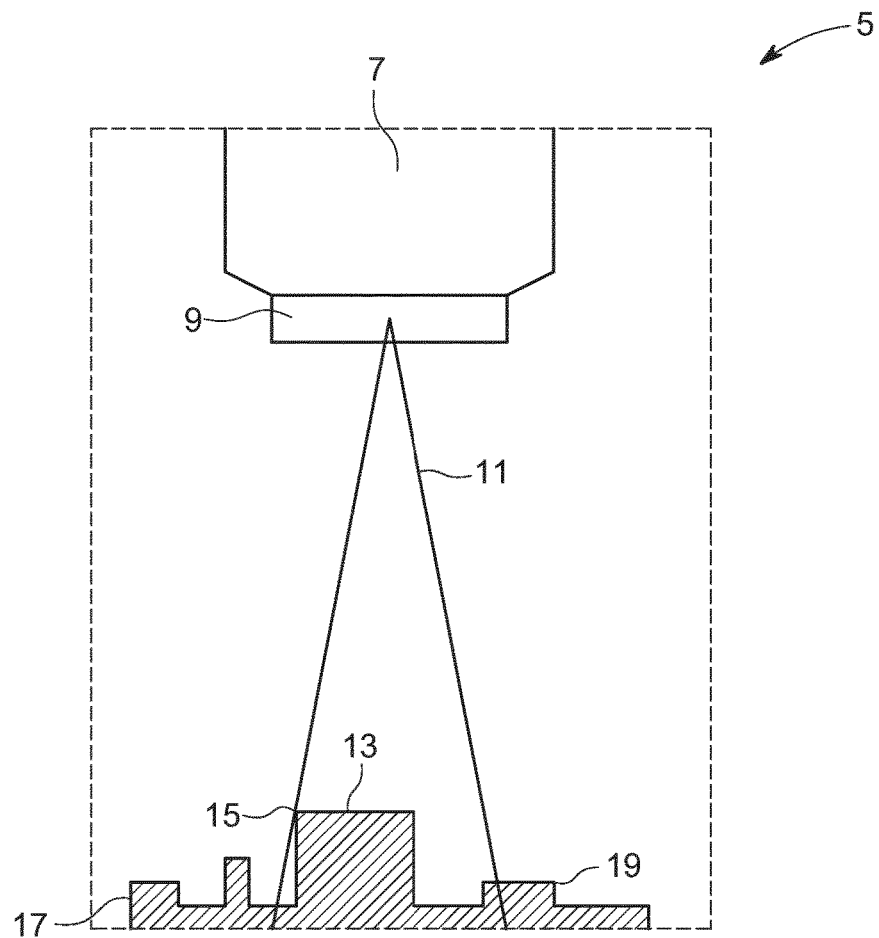
FIG. 2 is a schematic diagram which shows an example of camera field of view.

FIG. 2 is a schematic diagram which shows an example of camera field of view 5. It shows a camera 7 with a lens 9 which has a field of view 11 with focal point 13. Two horizontal planes are shown, plane A 15 and plane B 19. The position of an object 17 is also shown. Using this diagram, if the system is calibrated to Plane A 15 then the mm/px value is only valid for that plane. Plane B 19 cannot be measured with a Plane A calibration value.

Figure 3:
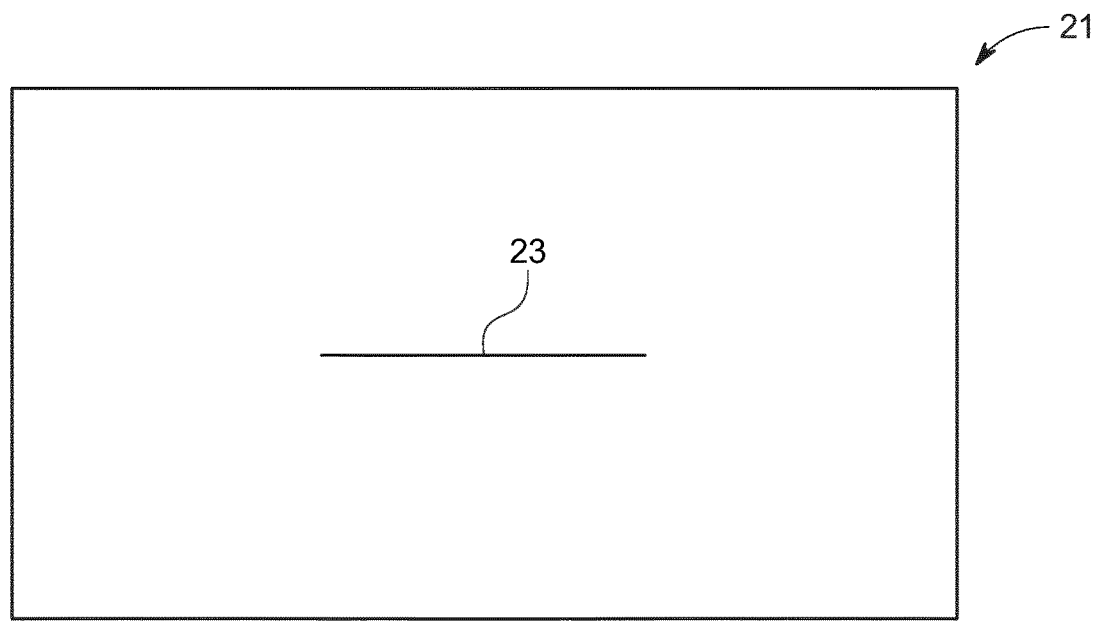
FIG. 3 shows an example of a calibration line on a screen as used in an example of the method of the present invention.

FIG. 3 shows a screen or image calibration region 21 which contains a calibration line 23. In this example of the present invention, the line has a length of 640 pixels and is located in the horizontal centre third of the centre line on the screen and has screen coordinate values (640,540) to (1280, 540).

Figure 4:
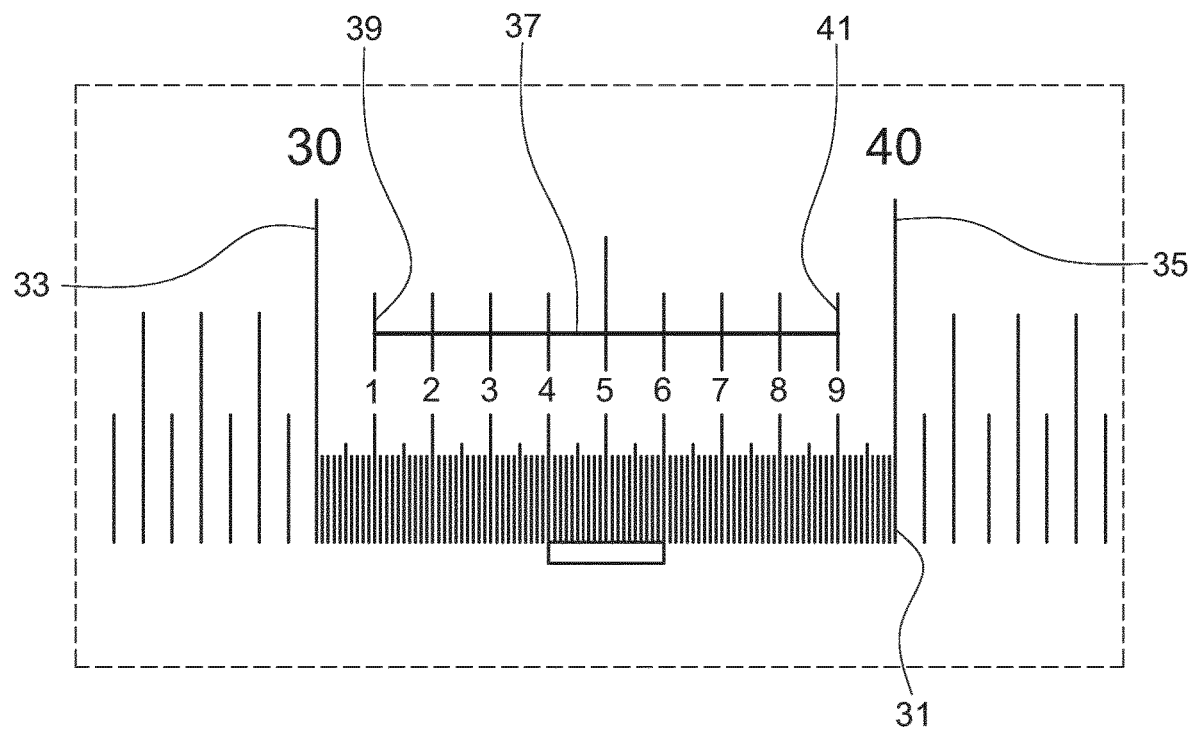
FIG. 4 is an image on a screen of a calibration line and a ruler at a first predetermined zoom level.

FIG. 4 shows a ruler 31 with markings at 30, 31 39 and 40 mm labelled 33, 39, 39, 41 and 35 respectively. If the ruler is placed under the microscope and an image is taken at a first zoom level, the measured value in pixels of the length of the ruler at these markings is made and equated to the 640 pixel calibration line 37. In this example, the 640 pixel calibration line is 8 mm in length as measured between scale markings on the 31 mm and 39 mm lines 39, 41 in FIG. 4.

Figure 5:
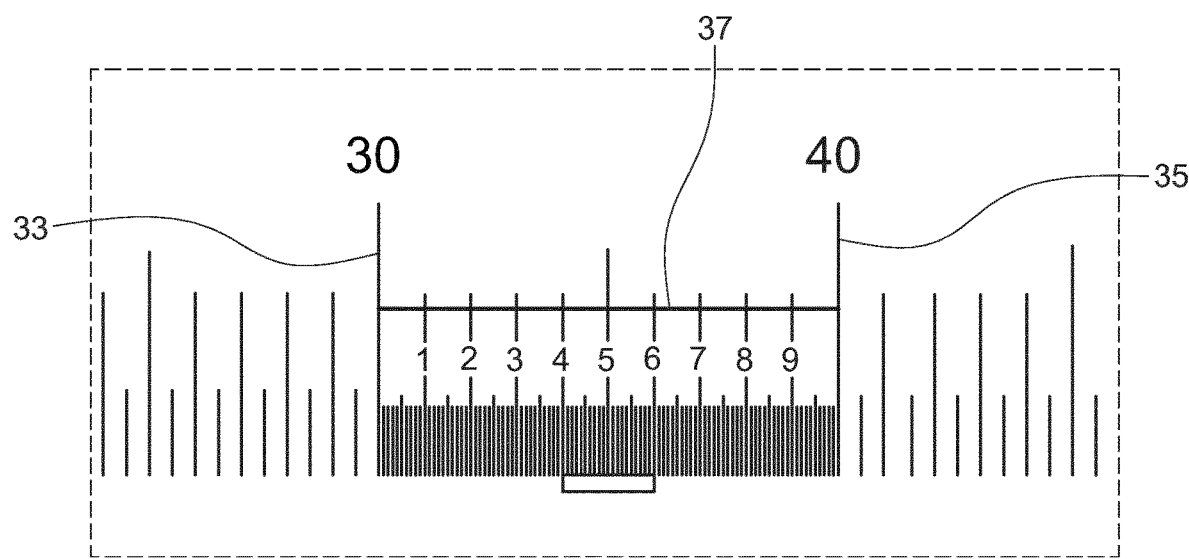
FIG. 5 is an image on a screen of a calibration line and a ruler at a second predetermined zoom level.

FIG. 5 shows the ruler 31 with markings at 30 and 40 mm labelled 33, 35. If the ruler is placed under the microscope and an image is taken at a second zoom level, we can measure the value in pixels of the length of the ruler at these markings and equate it to the 640 pixel calibration line 37. In this example, the 640 pixel calibration line is 10 mm in length as measured between scale markings on the 30 mm and 40 mm lines 33, 35 in FIG. 5

By creating a mm/px value for every zoom position, the camera may be queried for its zoom position and measurements can be made on all zoom levels.

Image processing is used to take accurate measurements when the ruler markings do not align with the 640 pixel region. After moving to the required zoom position, the image is allowed to stabilize for 200 ms. A snapshot of the screen is taken and then converted to a grayscale image. The centre 640 pixels are extracted and this strip of pixels is then placed onto the first line of a new blank bitmap image. The zoom position is then increased by a set number of steps (zoom_step_size) and the process is repeated, adding each new extracted strip of pixels into the next line of the blank bitmap. This is done until maximum zoom is reached.

Figure 6:
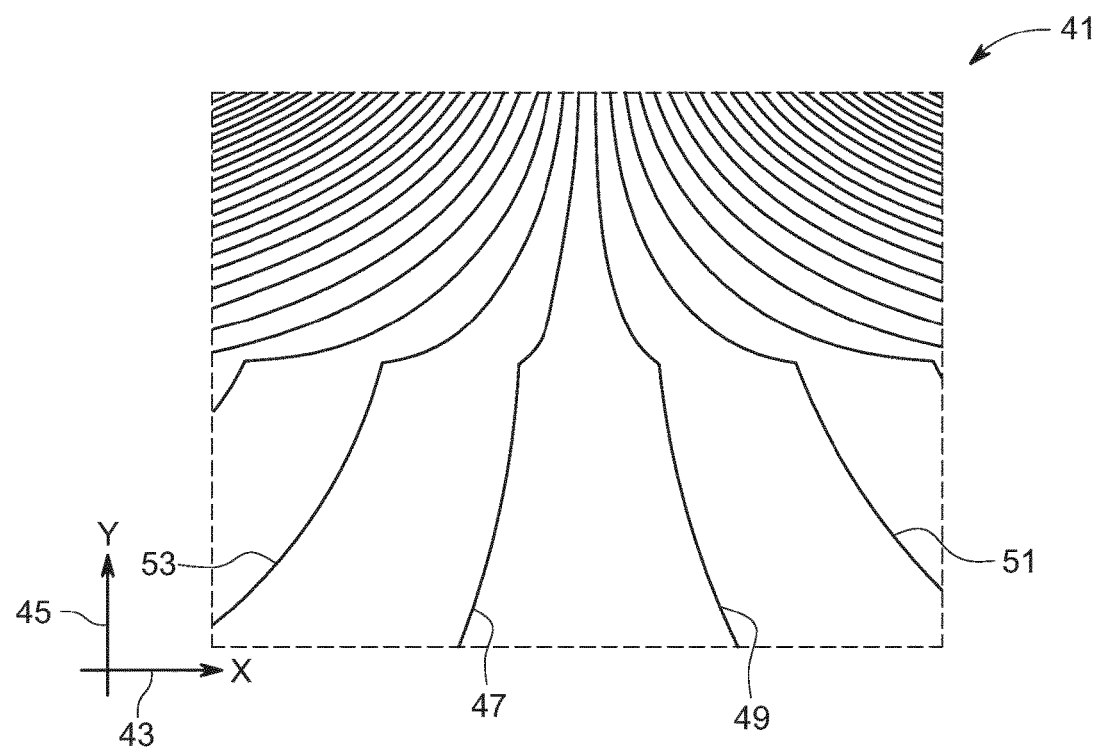
FIG. 6 is a graphical representation of a succession of ruler scale markings at a plurality of different zoom levels.

FIG. 6 is an image 41 which represents the position of ruler scale markings viewed at different zoom levels. The x axis 43 represents the physical location across the ruler and the respective scale markings. The y axis 45 represents the change in zoom level of the camera. Four ruler markings 47, 49, 51 and 53 are shown. The shape and separation of the line's change with the zoom level.

Figure 7:
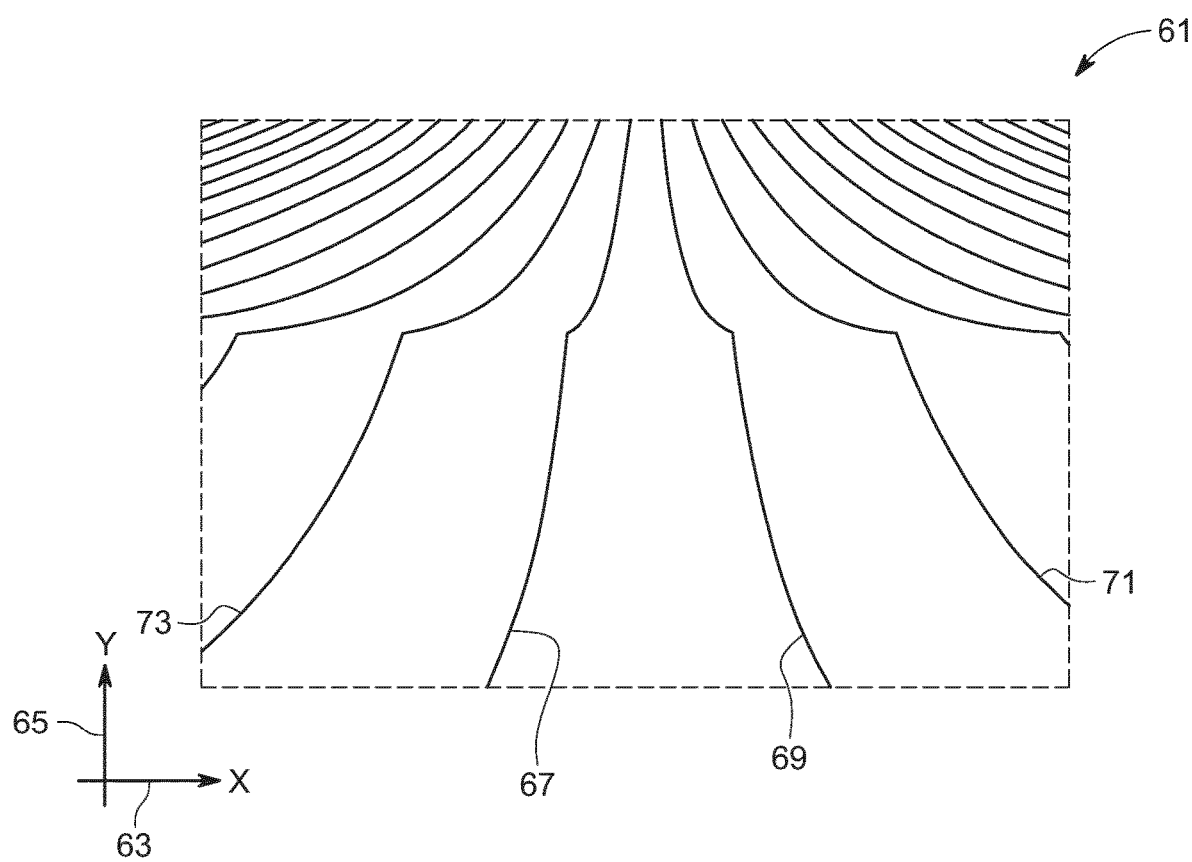
FIG. 7 is a processed image of the image of FIG. 6.

FIG. 7 is a processed version 61 the image of FIG. 6. The x axis 63 represents the physical location across the ruler and the respective scale markings. The y axis 65 represents the change in zoom level of the camera. Four ruler markings 67, 69, 71 and 73 are identified, by way of example. FIG. 7 shows the image of FIG. 6 once it had been processed using adaptive thresholding based on OTSU binarization. This creates a binary output image which will then be used for the detection of the number of lines (white pixels) in each row. Each row in the image represents a zoom level. Each white line represents a ruler marking. In this example the ruler used has 0.5 mm markings.

The image is processed using a row to row method. Each row is analysed starting at the first pixel of the row. Every pixel is tested for the value 255 which represents a line (white pixel). When the first white pixel is detected on a row, the position (number of pixels from the start of the row) is recorded. This is defined as the line_one_position. The following pixels are then tested and if the value drops to 0 (which represents the background) then we know we have finished detecting a line. The pixels in the row are scanned through sequentially until the next white pixel is detected and is recorded at a position defined as the last_line_position, as counted by the number of pixels from the start of the row. Every time a new line is detected the variable last_line_position and a new variable number of lines are updated. When all 640 pixels in the row have been scanned three variables are recorded, (line_one_position, number_of_lines and last_line_position).

Since each row represents a zoom level the mm/px value for that zoom level can be calculated using the three variables detected.

L1=line_one_position
Ln=number_of_lines
LnP=last_line_position
S=ruler_spacing $$mm/px=(LnP-L1)/S(Ln-1)$$

The above formula calculates the mm/pixel value based on the number of pixels between the first and last line, divided by the actual length of the number of lines detected.

This value is then entered into a data table. The table contains two columns, zoom_position and mm/px_value. The zoom position value is calculated as follows.

$$zoom\_position=(image\_row\_number)*zoom\_step\_size$$

The zoom_step_size is the increase between steps that was used when capturing the calibration image. This value does not change through the test.

This process is repeated for each row in the image.

The data table is then written to a .csv file. The file name contains a reference to the lens used.

Figure 8:
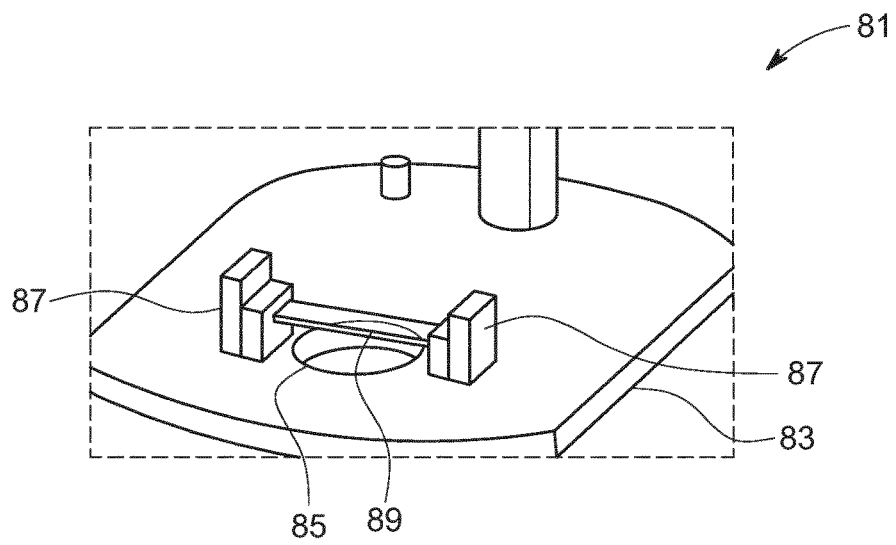
FIG. 8 is an apparatus which assists with calibration of the lens by holding a ruler at a fixed distance in a microscope.

In order to produce a detailed high contrast image from which to calibrate the lens, a customized glass slide using laser etched markings of 0.5 mm was used as shown in FIG. 8. The slide comprises a mounting platform 81 which has a base 83, an aperture 83, graticule holder 87 upon which a ruler 89 is mounted.

An uplight diffuser shines through the aperture 83 and is used to highlight the markings of the ruler 89. The ruler 89 is mounted 15 mm above the surface of the uplight diffuser on the base stage using a custom 3d printed graticule holder 87. The ruler is mounted at 15 mm to reduce the detail of the uplight surface which can contaminate the calibration image. To ensure that the image is in focus throughout the zoom range the camera is set to infinity focus and maximum zoom. The height of the unit under test is then adjusted until the ruler markings are in focus. Once the focus is set, the zoom position is set to minimum and the test is started.

Some camera sensors can contain dead pixels which are masked by setting the value of the bad pixel to an interpolated value derived from the neighbouring pixels. If our camera sensor contains a bad pixel that happens to fall on our 640 pixel wide centre strip it can cause an issue.

Figure 9:
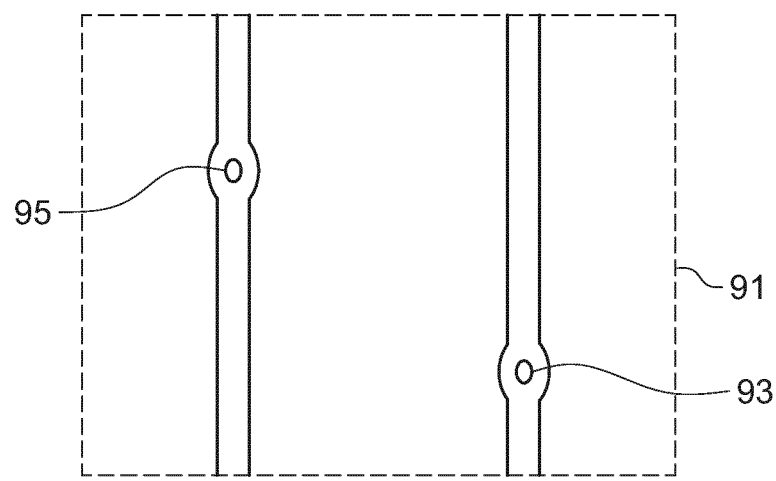
FIG. 9 is an image containing defective pixels.
Figure 10:
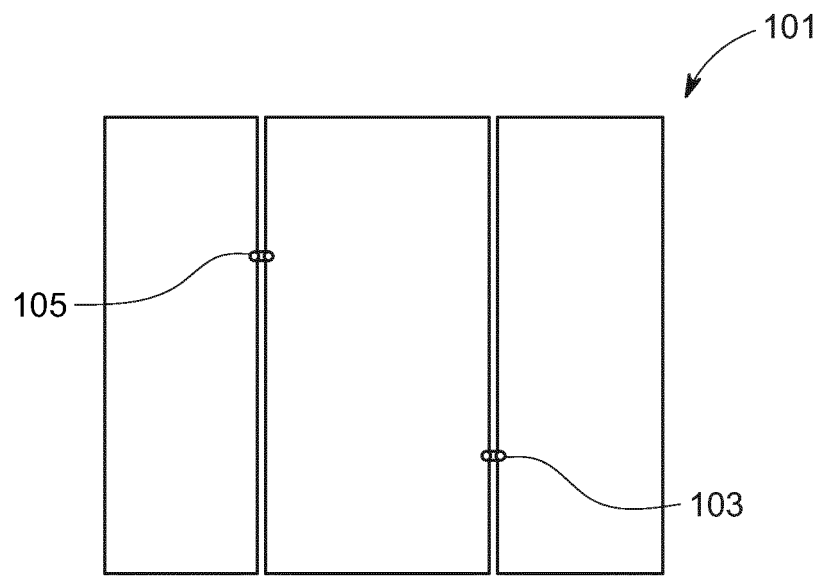
FIG. 10 is a processed version of the image of FIG. 9.

FIGS. 9 and 10 show images 91, 101 of defective pixels 93, 95, 103, 105 respectively. The defective pixels 93, 95, FIG. 9 fall on a ruler line. When we convert this image to a binary one image, FIG. 10, the lines are split 103, 105.

If a row is scanned which contains a defective pixel and that pixel falls on a line of the ruler, it will split the line resulting in an extra line detected. To overcome this issue an extra two lines are extracted from each zoom position.

Figure 11:
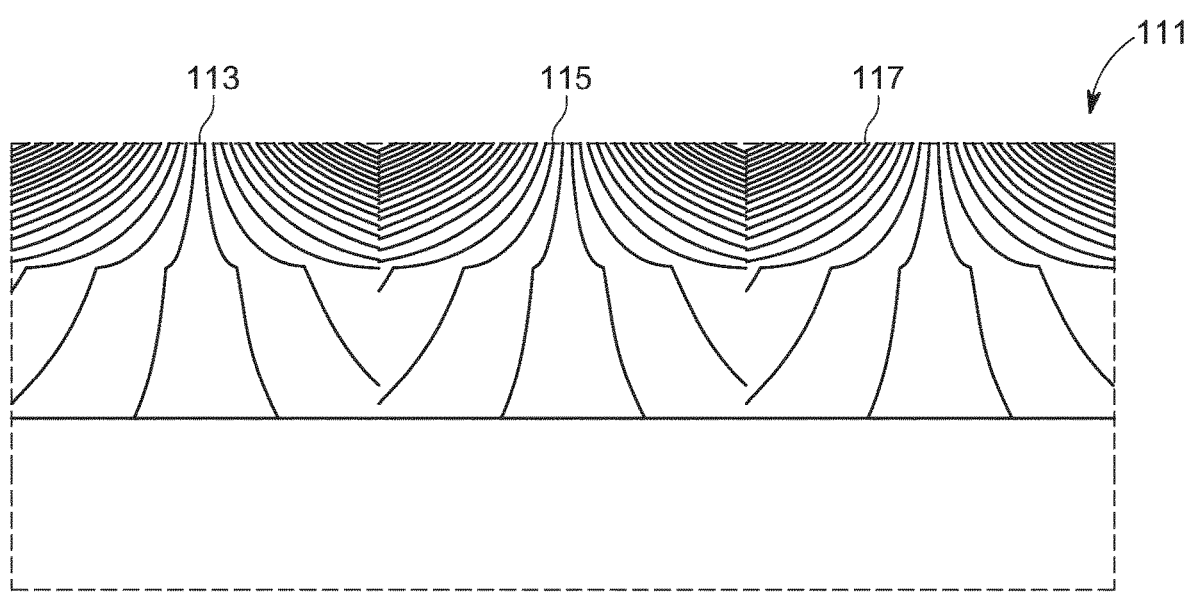
FIG. 11 is a series of three stacked pixel images.

FIG. 11 is an image 111 which shows a series of three stacked pixel images Rather than just copy the pixels from (640,540) to (1280,540) into the blank bitmap image, each set is copied into the blank bitmap. The pixel strip from line 630 is stacked on the left 113, the pixel strip from 640 is stacked in the centre 115 and the pixel strip from 550 is stacked on the right 117.

Figure 13:
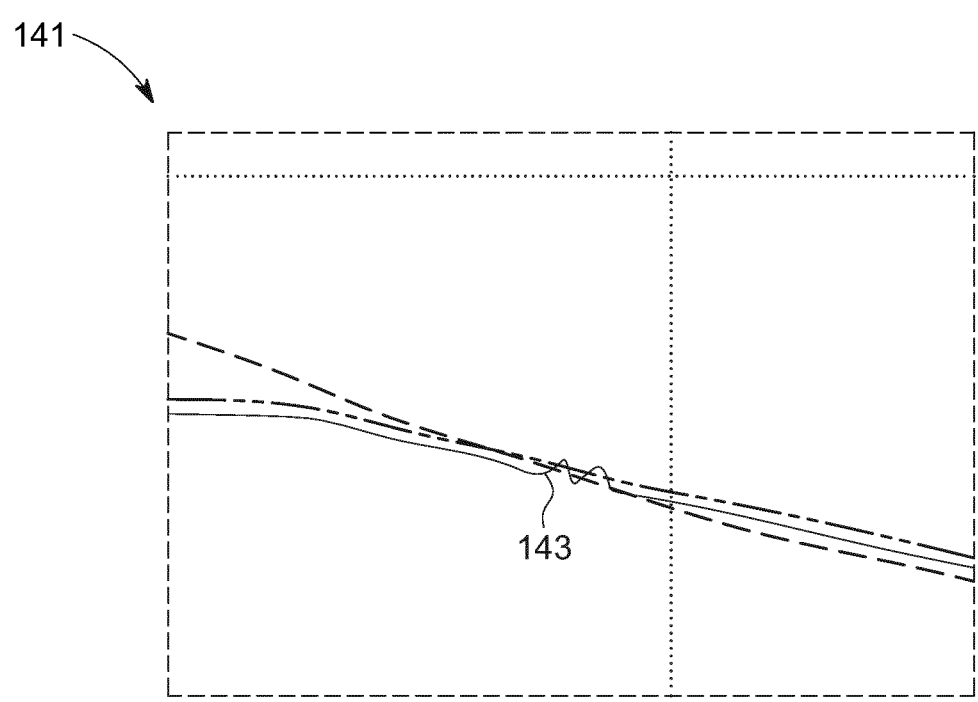
FIG. 13 is a section of a calibration curve containing errors.

During the line detection stage, the user has a choice of which line is to be processed. Once the calibration is complete, the graph curve for each lens should always decrease in a smooth fashion. Any errors in the line detection stage can be viewed as spikes/dips in the graph values. FIG. 13 shows a close up of a region 141 of some calibration curves. The spike in the curve 143 illustrates error values.

Figure 12:
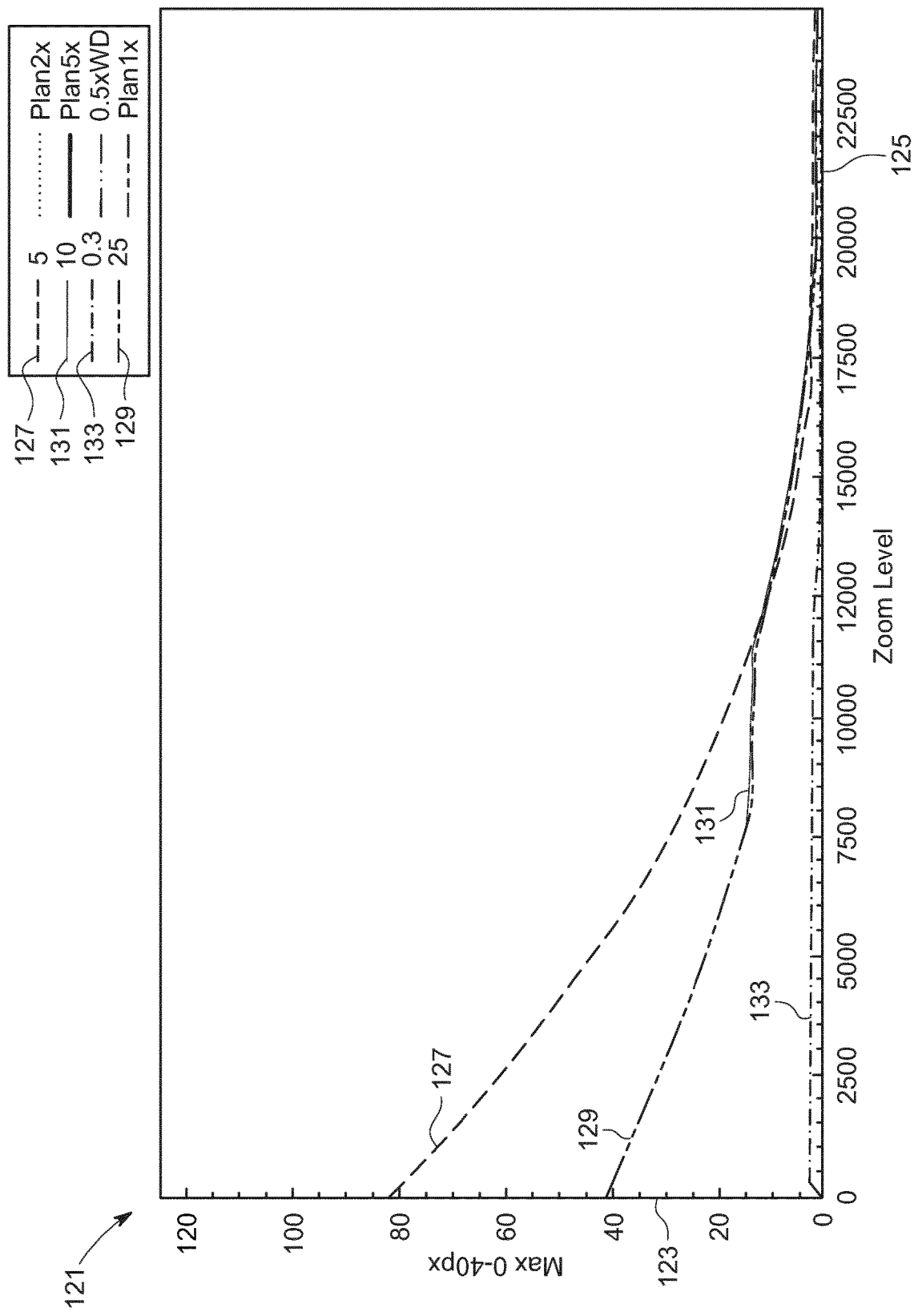
FIG. 12 is a calibration curve.

Once the processing is complete, the Calibration Software can display a graph which represents the mm/px curve. FIG. 12 shows a calibration curve graph 121 with a y axis which plots mm/pixel and an x axis 125 which plots zoom level.

Curves 127, 129, 131 and 133 are examples of calibration curves which correspond to different lenses.

A user may select which lens is physically fitted to the unit by clicking on the lens type from a drop down list in the GUI. The system then gets the current zoom position and looks up the corresponding mm/px value from the data table. If the current zoom position is between two values on the data table, linear interpolation is used.

To do this, the first zoom position in the data table is compared to the current zoom position. If the current zoom position is not greater then it is compared to the next zoom position value in the data table. This is repeated until the value in the data table is greater. The greater value is then used as zoom_position_upper. The previous value in the table is then used as zoom_position_lower. A proportion of the zoom_step_size (which was 256 as described above) is then calculated. This proportion is then applied to the difference between the mm/px values of the zoom_position_upper and zoom_position_lower.

Example

| Zoom position | mm/px |
|---|---|
| 0 | 10 |
| 256 | 8 |
| 512 | 6 |
| 1024 | 5 |

If the zoom position read back was 383 (which is half-way between zoom positions 256 and 512) then the corresponding mm/px value would be half-way between 8 and 6, which is 7.

| Current zoom position | mm/px |
|---|---|
| 383 | 7 |

Now knowing the mm/px value for the zoom position means that by using basic geometric principles, the method and system can calculate point to point, circular, angular dimensions etc from any points on the screen. The screen magnification can also be displayed by setting the monitor size in the software GUI.

The embodiments in the invention described with reference to the drawings may comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

It will be appreciated that in the context of the present invention that the term 'graticule' can be interpreted broadly and to mean 'reticle' as the terms are technically equivalent.

It will be further appreciated that the invention can be applied to testing objects in a range of industries, for example Medical Devices, Electronic Component testing and objects that require testing of Precision Engineering objects.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for calibrating a digital imaging apparatus, the method comprising the steps of:
    placing an object of known dimensions in a field of view at a predetermined distance from a camera;
    creating a digital image of the object obtained from said camera;
    measuring the object dimensions in the digital image; characterised by the steps of:
    creating a mathematical relationship between the object dimensions and the measured object dimensions in the digital image;
    creating n additional digital images from said camera, each image having a distinct camera zoom level based on the mathematical relationship; measuring the position of a plurality of locations on the object for the n additional images;
    calculating a calibration value for said locations in the n additional digital images;
    linking corresponding locations in the n additional images to create a calibration metric for a plurality of zoom values; and
    calibrating a lens by comparing the zoom position of the lens in the camera with the calibration metric.

2. The method as claimed in claim 1, wherein the object dimension being measured is a straight line.

3. The method as claimed in claim 1, wherein the object dimension being measured is a straight line and the straight line follows a horizontal axis across the digital image.

4. The method as claimed in claim 1, wherein the objection dimension being measured is a straight line and the straight line follows a vertical axis across the digital image.

5. The method as claimed in claim 1, wherein the object dimension being measured is two dimensional.

6. The method as claimed in claim 1, wherein the object is a ruler.

7. The method as claimed in claim 1, wherein the object is a ruler and the ruler has scale markings which define fixed distances between points on the ruler.

8. The method as claimed in claim 1, wherein measuring the object dimension comprises creating a calibration region on the digital image, measuring the object dimension with reference to the calibration region.

9. The method as claimed in claim 8, wherein the digital image measurement is made in pixels.

10. The method as claimed in claim 8, wherein the digital image calibration region comprises a straight line.

11. The method as claimed in claim 8, wherein the digital image calibration region comprises a two-dimensional shape.

12. The method as claimed in claim 11, wherein the two dimensional shape is square, rectangular or curved.

13. The method as claimed in claim 8, wherein the shape of the calibration region matches that of the object dimension.

14. The method as claimed in claim 1, wherein the plurality of locations are scale markings on a ruler.

15. The method as claimed in claim 1, wherein the step of calculating a value comprises creating a ratio of the actual object dimension and the digital image measurement.

16. The method as claimed in claim 1, wherein the calibration metric is a graph or a formula representing a graph curve.

17. The method as claimed in claim 1, wherein the calibration metric is a look-up table.

18. The method as claimed in claim 1, wherein the step of creating n additional digital images comprises, creating a digital image at a zoom level, extracting a calibration region from the image, adding the calibration region to a calibration image as a first line, changing the zoom level and repeating n times to create a series of lines on the calibration image.

19. The method as claimed in claim 18, wherein the calibration image is a bitmap image.

20. The method as claimed in claim 18, wherein the digital image is converted to a grayscale image and further processed using an adaptive thresholding based on Otsu's method of binarization.

21. The method as claimed in claim 18, wherein the calibration image is processed by scanning each row in the image to detect pixels which represent lines and recording their position.

22. The method as claimed in claim 18, wherein one or more detected line positions are extracted for use in a calibration graph or table wherein the zoom values can be used to generate a formula which represents a curve of the graph.

23. The method as claimed in claim 1, wherein a plurality of lines are extracted for a single zoom value so as to provide alternative line samples to mitigate image errors.

24. The method as claimed in claim 1, wherein the object dimension being measured is square, rectangular or curved.

25. The method as claimed in claim 1, wherein the object dimension being measured is an angle, polygon or an area.

26. A system for calibrating a digital imaging apparatus, the system comprising: means for placing an object of known dimensions in a field of view at a predetermined distance from a camera;

means for creating a digital image of the object obtained from said camera;

means for measuring the object dimensions in the digital image; characterised by:

means for creating a mathematical relationship between the object dimensions and the measured object dimensions in the digital image; means for creating n additional digital images from said camera, each image having a distinct camera zoom level based on the mathematical relationship;

means for measuring the position of a plurality of locations on the object for the n additional images;

means for calculating a calibration value for said locations in the n additional digital images;

means for linking corresponding locations in the n additional images to create a calibration metric for a plurality of zoom values; and means for calibrating a lens by comparing the zoom position of the lens in the camera with the calibration metric.

\* \* \* \* \*